Sept. 1, 1959  H. E. DUNN  2,901,828
APPARATUS FOR INDICATING THE DIP OF AN ELECTRODE
IN A SUBMERGED ARC ELECTRIC FURNACE
Filed Feb. 14, 1958                                  6 Sheets-Sheet 1
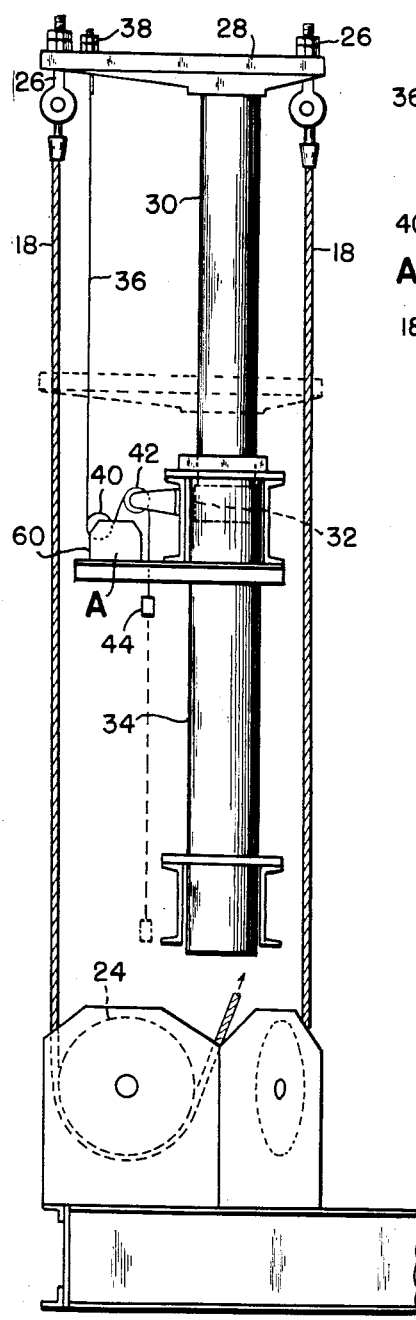
Fig. 2
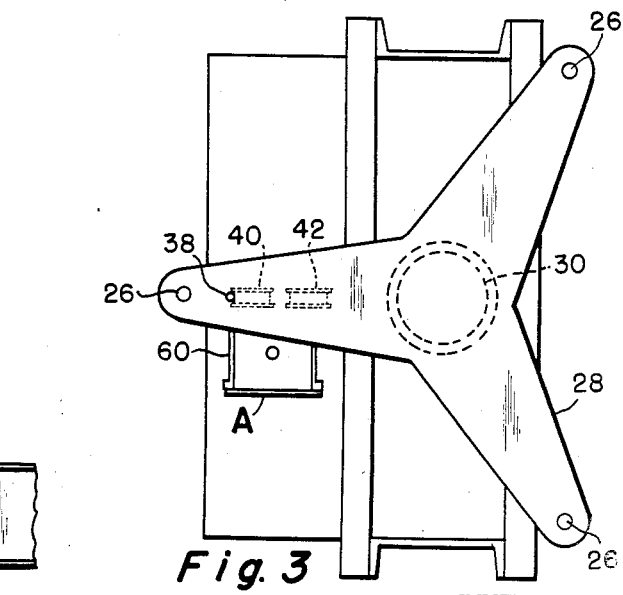
Fig. 1
Fig. 3
INVENTOR.
Holbert E. Dunn
BY
Welly, Mackey & Burden
HIS ATTORNEYS Sept. 1, 1959 H. E. DUNN 2,901,828
APPARATUS FOR INDICATING THE DIP OF AN ELECTRODE
IN A SUBMERGED ARC ELECTRIC FURNACE
Filed Feb. 14, 1958 6 Sheets-Sheet 2

INVENTOR.
Holbert E. Dunn
BY
HIS ATTORNEYS

INVENTOR.
Holbert E. Dunn

INVENTOR.
Holbert E. Dunn
BY
Webb, Mackey & Barden
HIS ATTORNEYS

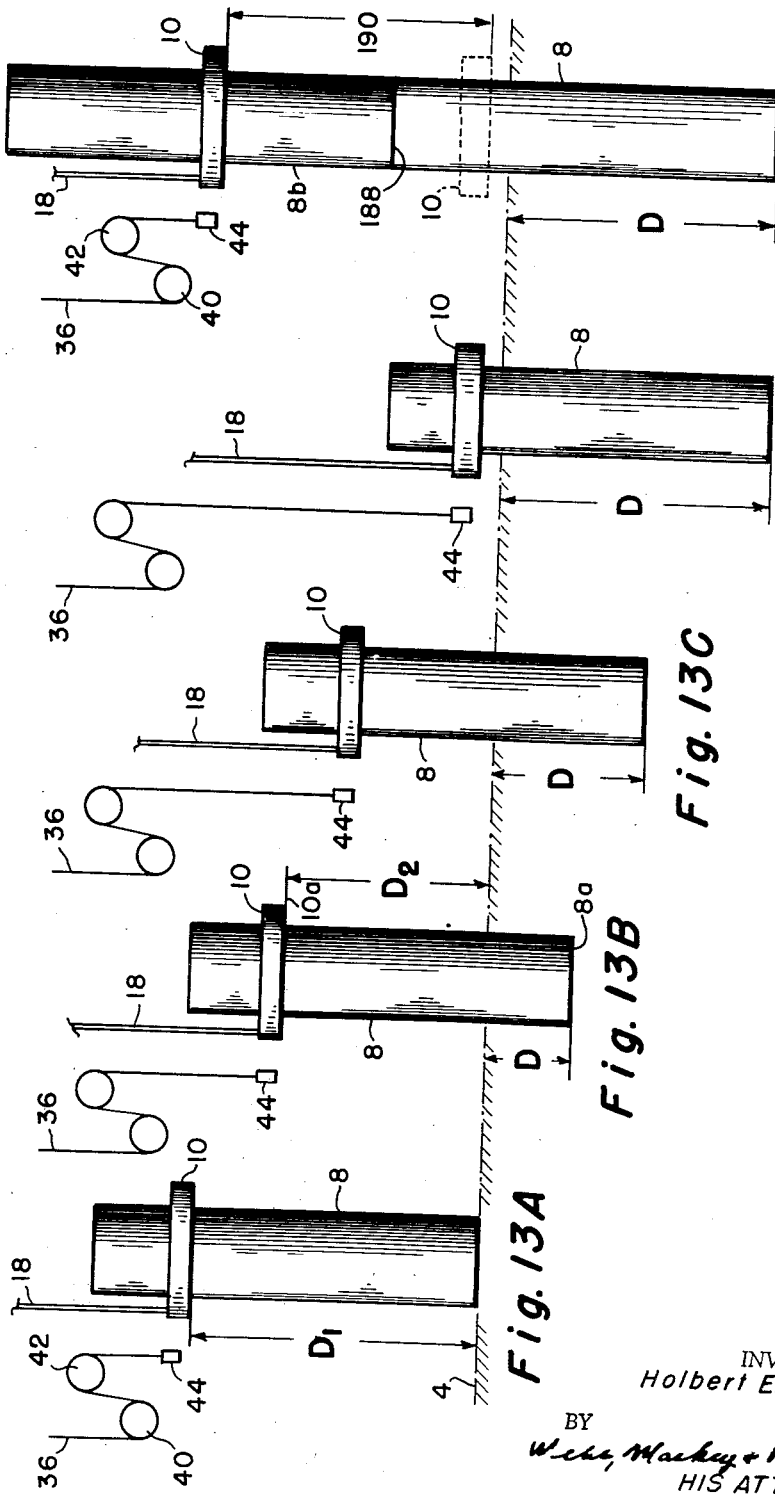

United States Patent Office 2,901,828
Patented Sept. 1, 1959

2,901,828

APPARATUS FOR INDICATING THE DIP OF AN ELECTRODE IN A SUBMERGED ARC ELECTRIC FURNACE

Holbert E. Dunn, Crafton, Pa., assignor to Vanadium Corporation of America, New York, N.Y., a corporation of Delaware Application February 14, 1958, Serial No. 715,234

1 Claim. (Cl. 33—125)

This invention relates to apparatus for indicating the dip of an electrode in a submerged arc electric furnace. The dip of an electrode is the distance from the tip of the electrode to the top rim of the furnace. It is important for the operator of the furnace to know the position, i.e., the dip of the electrode in the furnace, since the dip of the electrode is an important factor in the efficiency of the furnace operation. If the furnace operator knows the dip of the electrode, he can regulate its position in order to obtain most efficient operation. In a submerged arc electric furnace, the tips of the electrodes are not visible because they are submerged in the charge.

In the accompanying drawings which illustrate a preferred embodiment of my invention:

Figure 1 is a diagrammatic side elevation of a submerged arc electric furnace having three electrodes and also showing the means for raising and lowering one of the electrodes, the level transmitter forming an element of the present invention also being shown together with certain of its connections;

Figure 2 is a side elevation, on a larger scale, showing a portion of the apparatus shown in Figure 1;

Figure 3 is a plan view of the apparatus shown in Figure 2;

Figures 13A–13E illustrate different positions of an electrode relative to the top rim of the furnace and further illustrate the slipping of an electrode.

Figure 4:
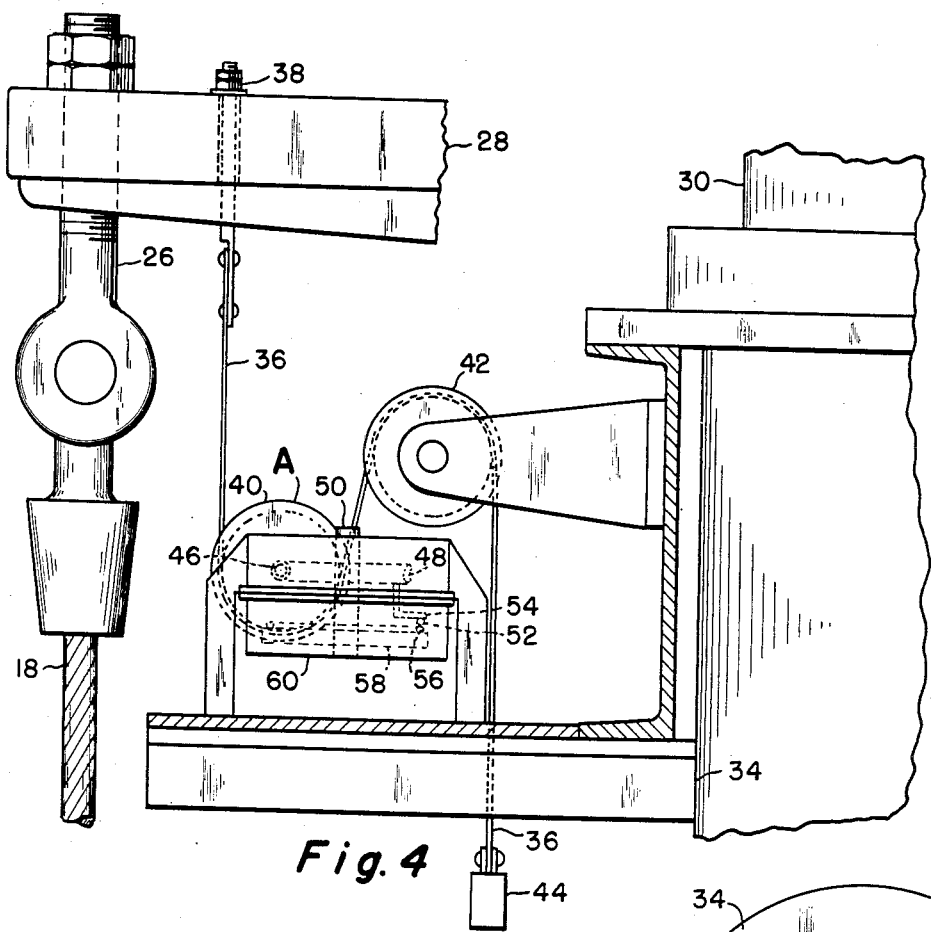
Figure 4 is an enlarged side elevation of the level transmitter and associated parts shown in Figure 2.
Figure 5:
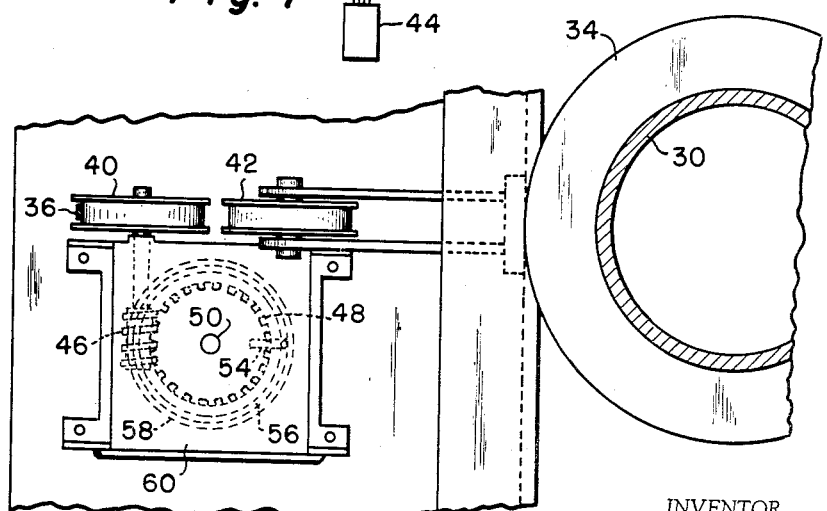
Figure 5 is a plan view of the apparatus shown in Figure 4.

The invention will be described in connection with a three-phase three-electrode furnace but is applicable to furnaces having a different number of electrodes. The apparatus necessary for operation with one electrode will be described, it being understood that a similar apparatus is employed for each other electrode.

Each electrode is supported by an electrode holder and a supporting arm in the usual manner and the furnace is provided with the usual means for raising and lowering the electrode. The apparatus of the present invention includes a level transmitter having a slide wire and a contact therefor. The level transmitter is operatively connected to the electrode holder so that as the holder is raised and lowered it varies the position of the contact on the slide wire of the level transmitter. The level transmitter is connected by a direct current Wheatstone bridge measuring circuit to an electrode position indicator and a galvanometer bridges the branches of the measuring circuit. Motor drive means, controlled by the galvanometer and connected to the electrode position indicator, are provided for balancing the measuring circuit so that the electrode position indicator indicates the position of the electrode in the furnace. Since the electrode position indicator is responsive to the position of the electrode holder, it indicates the position of the holder relative to the rim of the furnace. If one knew the butt length of the electrode, i.e., the distance from the tip of the electrode to the holder, the position of the holder relative to the top rim of the furnace would enable one to determine the dip of the electrode if the electrode did not burn off in use. However, since electrodes do burn off in use, one must take into consideration the burn-off rate in order to accurately determine the dip of the electrode. In accordance with the present invention, a butt length burn-off compensator slide wire and a contact for it is included in each branch of the Wheatstone bridge measuring circuit. The slide wire of each of the butt length compensators is motor driven at a constant predetermined speed (estimated to be the correct burn-off rate) to change the position of the contact thereon and thereby change the resistance in the branch of the measuring circuit in which it is located. The effect is to compensate for the burn-off of the electrode, assuming that the burn-off rate has been accurately estimated. If not, by a comparison with an actual measurement, the estimated burn-off rate can be changed.

Referring now more particularly to the accompanying drawings and for the present to Figures 1–5, reference numeral 2 designates a submerged arc electric furnace having a top rim 4. The top of the charge of material is designated by reference numeral 6 and the electrodes by reference numeral 8. Each electrode is supported by a holder 10 and a supporting arm 12, the arm being connected to a sleeve 14 which slides on a post 16. A cable 18 is connected at 20 to the sleeve 14, passes around pulleys 22 and 24 and is connected at 26 to a spider 28 secured to a piston rod 30 having a piston 32 operating in a cylinder 34.

A metal tape 36 is connected at 38 to the spider 28. The tape passes around a pulley 40 and then around an idler pulley 42 and is provided with a counterweight 44. The pulley 40 is secured to a worm 46 which drives a worm wheel 48 mounted on a vertical shaft 50. An electric contact 52 is secured to an arm 54 connected to the worm wheel 48. The contact 52 slides on a slide wire 56 mounted on an insulating plate 58. Thus, the contact 52 is moved along the slide wire 56 as the electrode holder 10 moves up and down. The slide wire 56, contact 52, worm wheel 48 and worm 46 are located in the case 60 of the level transmitter which is designated generally by reference letter A.

Figure 6:
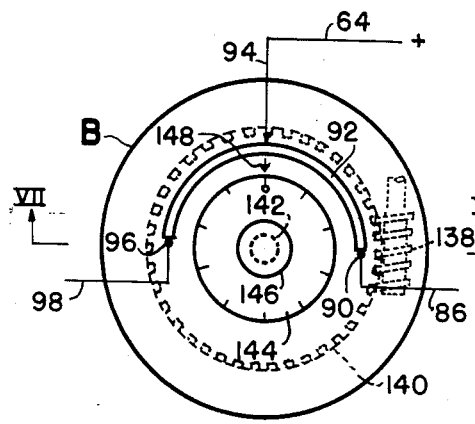
Figure 6 is a plan view of the electrode position indicator.
Figure 7:
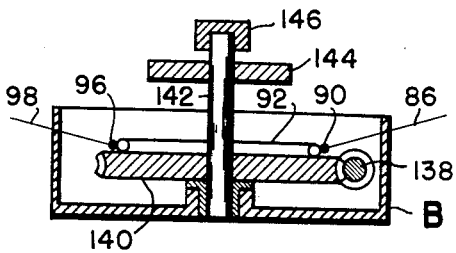
Figure 7 is a vertical section taken on the line VII—VII of Figure 6.
Figure 8:
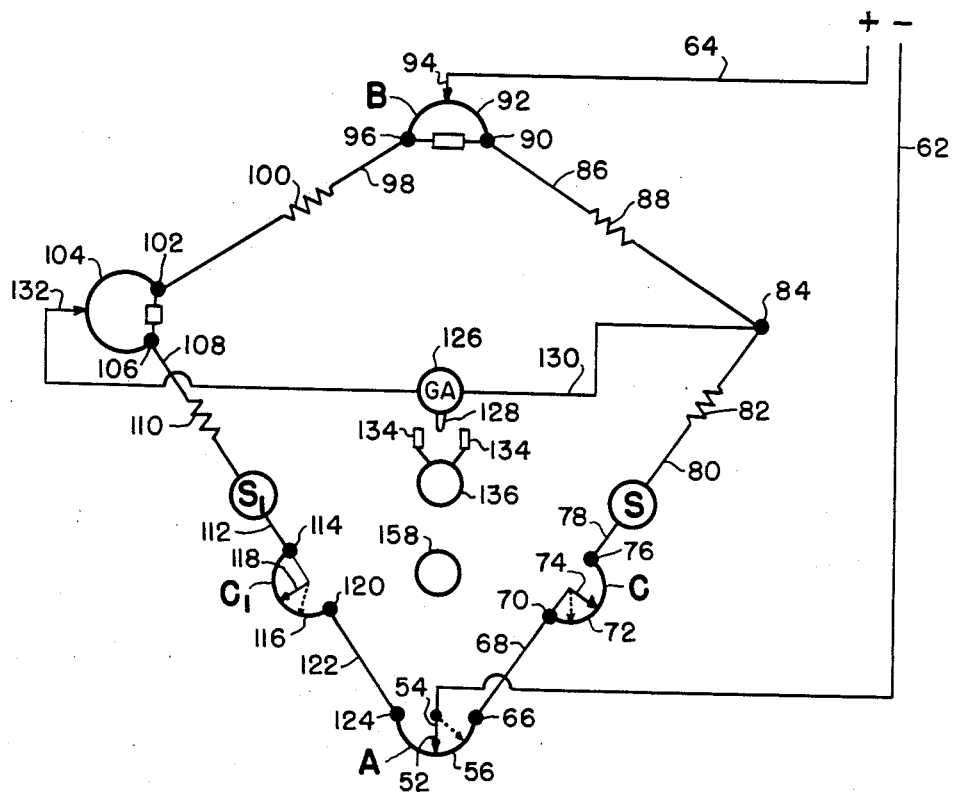
Figure 8 is a simplified wiring diagram of the Wheatstone bridge measuring circuit.

Referring now more particularly to Figure 8, the level transmitter A is connected by a direct current Wheatstone bridge measuring circuit to an electrode position indicator, designated generally by reference letter B. The contact 52 of the level transmitter A is connected to a negative lead wire 62 and the electrode position indicator B is connected to a positive lead wire 64. A terminal 66 on the slide wire 56 is connected by a wire 68 to a terminal 70 on a slide wire 72 of a butt length compensator unit designated generally by reference letter C and illustrated in Figures 10 and 11. A contact 74 is motor driven to move it at a constant rate along the slide wire 72 of the butt length compensator as later described. The other terminal 76 on slide wire 72 is connected by a wire 78 to a switch S. The switch S is connected by a wire 80 including a resistance 82 to terminal 84. A wire 86, having a resistance 88, connects terminal 84 with a terminal 90 of a slide wire 92 of the electrode position indicator B which is illustrated in Figures 6 and 7. A contact 94, which moves on the slide wire 92, is connected to the positive lead 64. A terminal 96 of the slide wire 92 is connected by a wire 98 having a resistance 100 to a terminal 102 of a slide wire 104. The other terminal 106 of slide wire 104 is connected by a wire 108 having resistance 110 to a switch $S_1$. The switch $S_1$ is connected by a wire 112 to a terminal 114 of a slide wire 116 of a butt length compensator unit $C_1$ which is similar to the butt length compensator unit C shown in Figures 10 and 11. A contact 118 is motor driven to move it at a constant rate along the slide wire 116 as explained later. A terminal 120 of the slide wire 116 is connected by a wire 122 to a terminal 124 on the slide wire 56 in the level transmitter A.

A galvanometer 126 having a pointer 128 is connected by a wire 130 to the terminal 84 and to the slide wire 104, the wire 130 having a movable contact 132 for contacting slide wire 104.

Movement of the electrode holder 10 causes rotation of the pulley 40 and moves contact 52 on slide wire 56 in the level transmitter A. This unbalances the measuring circuit and causes current to flow through the galvanometer 126, thereby moving the pointer 128. The pointer 128 contacts one of the contacts 134 which causes a motor 136 to operate. The motor 136, by means not shown, drives a worm 138 in the electrode position indicator B shown in Figures 6 and 7 which drives a worm wheel 140 mounted on a shaft 142. The slide wire 92 is secured to and movable with the worm wheel 140. A dial 144 is secured to the shaft 142. A knob 146 allows the dial to be reset to any desired position. The motor 136 continues to operate until the measuring circuit is in balance. The dip of the electrode is indicated by a pointer 148.

Figure 10:
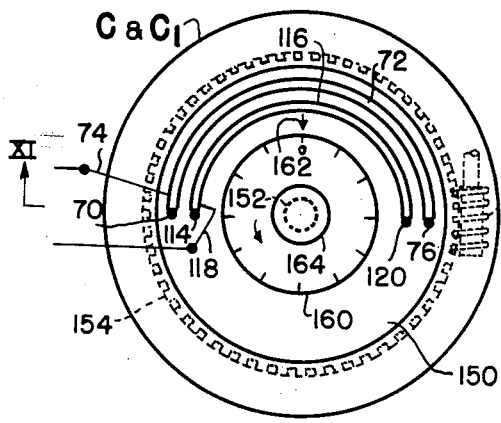
Figure 10 is a plan view of one of the two butt length burn-off compensator units.
Figure 11:
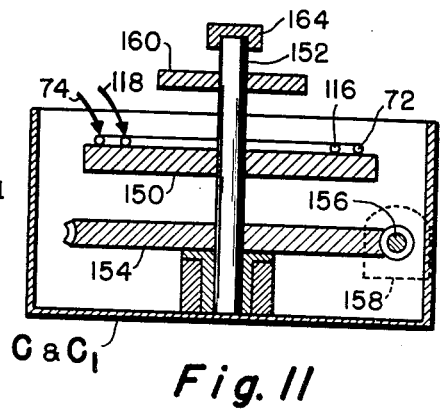
Figure 11 is a vertical section taken on the line XI—XI of Figure 10.

A butt length burn-off compensator unit is illustrated in Figures 10 and 11. The two slide wires 72 and 116 of the butt length compensators C and $C_1$ respectively, shown in Figure 8, are mounted on an insulating disc 150 secured to a shaft 152 which is driven through a worm wheel 154 and worm 156 by a motor 158. The contact 74 contacts the slide wire 72 and the contact 118 contacts the slide wire 116. The motor 158 moves the two slide wires 72 and 116 intermittently at a predetermined speed corresponding to the estimated burn-off rate of the electrode, the motor 158 rotating in such a direction that slide wire 72 decreases in resistance as slide wire 116 increases in resistance. A dial 160 is secured to the shaft 152 and cooperates with a pointer 162. A knob 164 is provided for resetting the dial 160 to any desired position of estimated burn-off rate.

Figure 9:
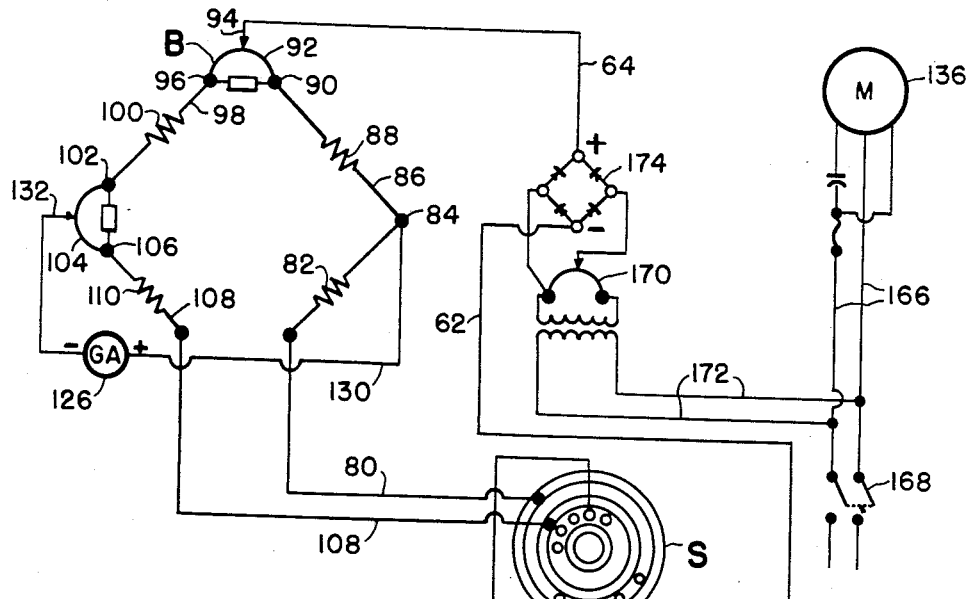
Figure 9 is a more detailed wiring diagram.
Figure 9:
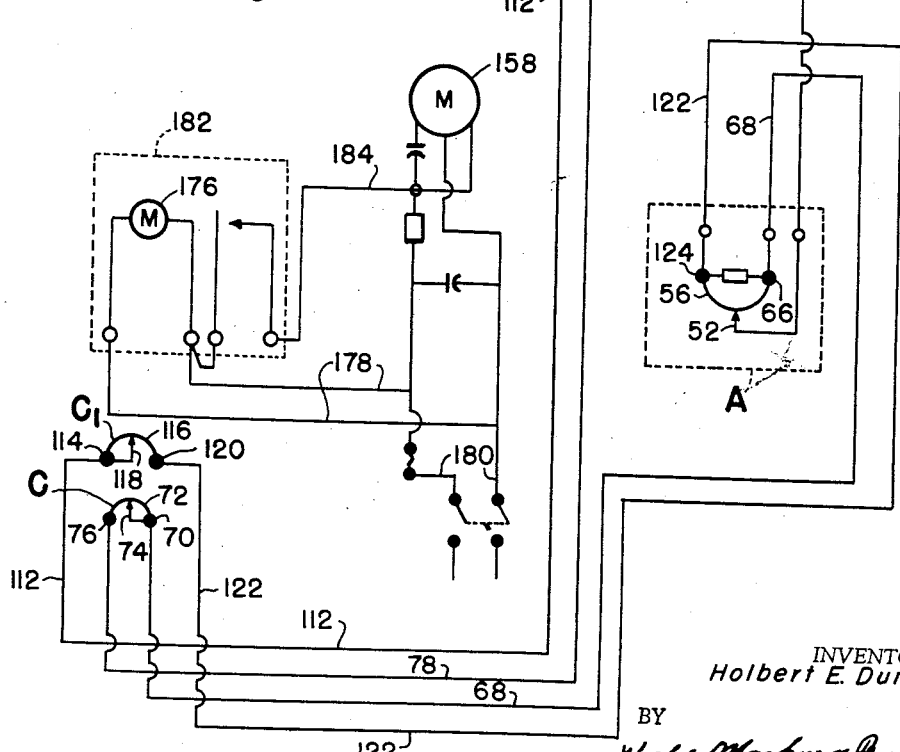

Referring to Figure 9, the motor 136 is connected by leads 166 including a switch 168 to a source of alternating current. A transformer 170 is supplied by leads 172 from the leads 166. The alternating current is rectified by a rectifier 174. A continuously operating alternating current motor 176 is supplied through leads 178 and leads 180 with alternating current. The motor 176 operates an interrupter or timer 182 which is connected by a lead 184 to the intermittently operated motor 158. The motor 158 rotates the slide wires 72 and 116 of the butt length compensator units C and $C_1$.

Figure 12:
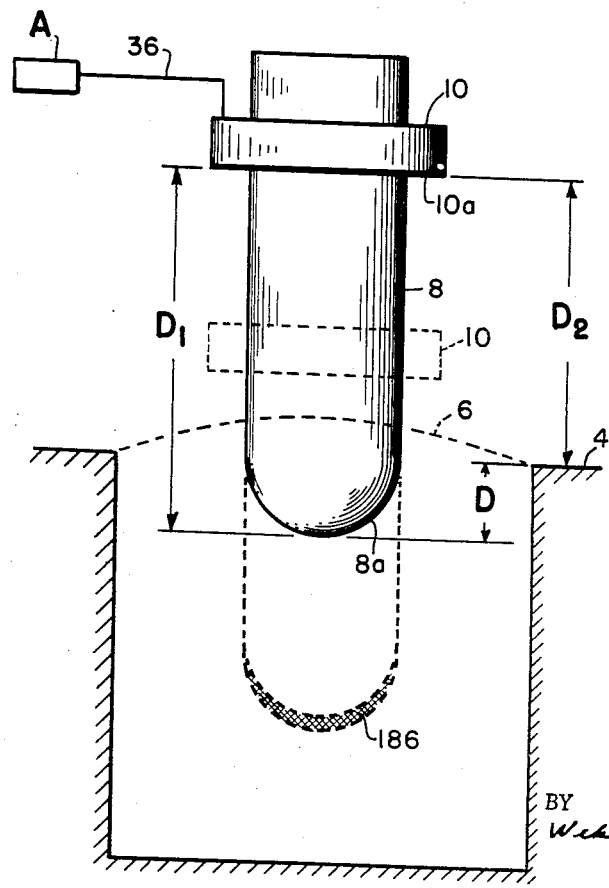
Figure 12 is a diagrammatic illustration showing the electrode in different positions and also showing the portion of an electrode which is burned off in a given period of time.

Referring now to Figures 12 and 13A–13E, let the reference letter $D_1$ represent the butt length of the electrode 8. The butt length is the distance between the bottom 10a of the holder 10 and the tip 8a of the electrode 8. Let $D_2$ represent the distance between the top rim 4 of the furnace and the bottom 10a of the electrode holder. Then the dip of the electrode, i.e., the distance the tip of the electrode is below the rim of the furnace, is represented by D wherein $D = D_1 - D_2$. In Figure 12, the electrode 8 is represented in full lines in an upper starting position and in dotted lines to a lower operating position. During operation of the furnace, the electrode burns off and the amount of the burn-off in a given time is represented by the shaded portion 186.

To place the apparatus in operation, the following sequence of steps should be employed:

(1) Raise the electrode 8 and the holder 10 to their maximum height as shown in Figure 13A.

(2) Set the dial 160 on the butt length compensator $C-C_1$ to 0 by turning the knob 164.

(3) Measure the butt length $D_1$.

(4) Lower the electrode and holder to the position shown in 13B so that the tip 8a extends at least 10 inches below the top 4 of the furnace.

(5) Measure the distance $D_2$.

(6) Subtract the distance $D_2$ from $D_1$ ($D_1 - D_2 = D$) to give the electrode dip D.

(7) Set this distance D on the butt length compensator dial 160 on the butt length compensator unit $C-C_1$ shown in Figures 10 and 11 by turning the knob 164. This rotates the slide wires 72 and 116 on the butt length compensators C and $C_1$, thus changing the relative positions of the contacts 74 and 118 on the slide wires respectively, and unbalances the Wheatstone bridge measuring circuit shown in Figure 8. Current flows through the galvanometer 126 and the motor 136 operates to balance the measuring circuit by turning the slide wire 92. The turning of the slide wire 92 rotates the dial 144 so that it indicates the dip D of the electrode.

(8) Set the butt length compensator unit interrupter or timer 182 for the estimated electrode burn-off in inches per hour.

(9) The electrode can now be lowered to desired position as shown in Figure 13C and power placed on the furnace.

The electrode position indicator B now reads the dip D of the electrode.

In the operation of the furnace, a time is reached when the electrode and holder cannot be lowered further, this position being shown in Figure 13D, and it then becomes necessary to "slip the electrode." This operation is shown in Figure 13E wherein another electrode 8b has been joined at 188 to the electrode 8 and the electrode holder has been slipped a distance 190. In slipping an electrode, the holder is loosened, the electrode or electrodes are slipped the desired amount by raising the holder and then the holder is tightened to the electrode in its raised position. Measure the amount of slip 190. As the holder is raised by raising spider 28 and cable 18, the tape 36 rotates the pulley 40 on the level transmitter A in a direction opposite to that in which it rotated when the holder was lowered. This moves the contact 52 on the slide wire 56 of the level transmitter A and unbalances the measuring circuit. The motor 136 then operates to balance the circuit by turning the slide wire 92 on the electrode position indicator B. As the slide wire 92 turns, the dial 144 on the electrode position indicator B moves toward zero so that when the measuring circuit is in balance, the indicator B does not correctly indicate the electrode dip. In order to correct this, the knob 164 on the butt length compensator units C and $C_1$ is turned to add the amount of electrode slip to the length already registered on the dial 160. Turning the knob 164 turns the slide wires 72 and 116 and unbalances the measured circuit. The motor 136 then operates to balance the circuit as previously described by turning the slide wire 92 of the electrode position indicator B. Turning the slide wire 92 turns the dial 144 so that the pointer 148 indicates the electrode dip.

The invention is not limited to the preferred embodiment but may be otherwise embodied or practiced within the scope of the following claim.

I claim:

Apparatus for indicating the dip of an electrode in a submerged arc electric furnace including an electrode holder and means for raising and lowering said holder, said apparatus comprising a level transmitter having a slide wire and a contact therefor, means connecting said holder and level transmitter to vary the relative positions of said slide wire and contact in accordance with the position of said holder relative to the furnace, an electrode position indicator having a slide wire and a contact therefor, a direct current Wheatstone bridge measuring circuit having two branches each connecting said level transmitter and said electrode position indicator, a butt length burn-off compensator slide wire and a movable contact for it in each of the branches of said measuring circuit, motor drive means operative at a constant rate for changing the relative positions of the contacts and slide wires of said burn-off compensators, and other motor drive means controlled by the bridge output and connected to said electrode position indicator for balancing said measuring circuit.

No references cited.

UNITED STATES PATENT OFFICE

CERTIFICATE OF CORRECTION

Patent No. 2,901,828                        September 1, 1959

Holbert E. Dunn

It is hereby certified that error appears in the above numbered patent requiring correction and that the said Letters Patent should read as corrected below.

In the grant, line 1, name of inventor, for "Holvert E. Dunn" read -- Holbert E. Dunn --; in the printed specification, column 4, line 4, for "lines to" read -- lines in --.

Signed and sealed this 1st day of March 1960.

(SEAL)
Attest:

KARL H. AXLINE
Attesting Officer

ROBERT C. WATSON
Commissioner of Patents